March 28, 1939.   L. F. BLUME ET AL   2,152,462
ELECTRIC CIRCUIT
Filed Dec. 30, 1937
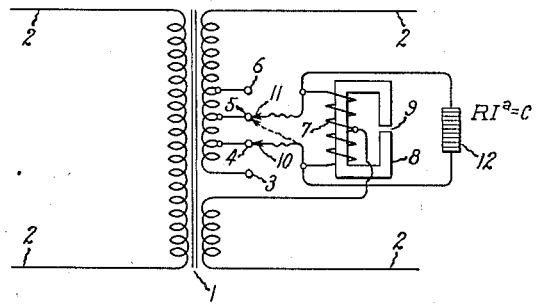
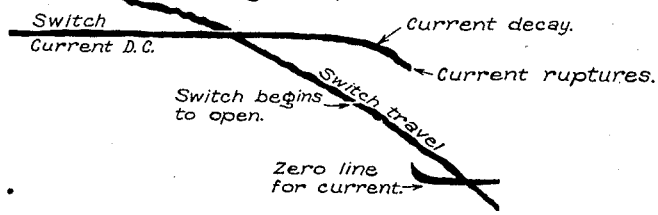
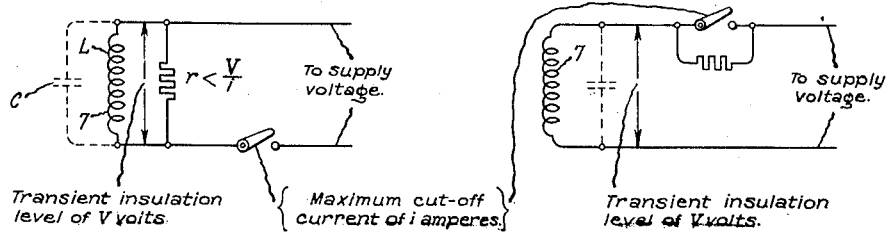
Inventors:
Louis F. Blume,
Loyal V. Bewley,
by Harry E. Dunham
Their Attorney.

Patented Mar. 28, 1939

2,152,462

UNITED STATES PATENT OFFICE 2,152,462

ELECTRIC CIRCUIT

Louis F. Blume and Loyal V. Bewley, Pittsfield, Mass., assignors to General Electric Company, a corporation of New York Application December 30, 1937, Serial No. 182,646

13 Claims. (Cl. 171—119)

This invention relates to electric circuits and more particularly to the protection of electric circuits containing inductance against insulation damaging high voltages caused by switching.

While this invention is primarily concerned with alternating current circuits in which medium sized currents are interrupted, it is not necessarily limited to such circuits and is applicable quite generally to circuits in which currents of all sizes, both direct currents and alternating currents, are interrupted.

The generally accepted theory of alternating current switching is that the current, as distinguished from the metallic conducting path carrying it, is not interrupted until a normal current zero point is reached. On this assumption it can be shown theoretically that the recovery voltage of the circuit, that is to say the voltage across the switch contacts after current interruption, can never exceed twice the normal peak voltage of the circuit. However, there have been a growing number of instances in which insulation flash-overs have occurred during switching which could only have been caused by voltages many more than twice the normal peak voltage of the circuit. For example, a number of preventive reactors used in changing taps under load (for regulating purposes) on power transformers and regulating transformers have had their insulation broken down during an ordinary tap-changing operation.

Upon investigation with a very fast three-element cathode ray oscillograph, it was found that the alternating current passing through a switch which is opening not infrequently actually ruptures at a definite value of current and at a time or angle considerably ahead of the time or angle corresponding to a normal current zero. Probably the reason that this fact has not generally been recognized sooner is that most previous switching studies were made in connection with larger currents, such as short circuit currents of the order of thousands and tens of thousands of amperes. When dealing with such very large currents the rupture of the current at a relatively small but definite value would be such a small fraction of the normal peak current during a cycle that the angle between the point where rupture actually takes place and normal current zero would be almost indistinguishable.

Current rupture by no means always occurs before current zero, and in fact, the rupture at current zero is the usual case. Furthermore, for any given switch the cut-off current, that is to say the current flowing at the instant of rupture, is not uniform. However, by recording the cut-off currents of any switch through a large number of successive operations thereof, a reasonably definite maximum cut-off current can be assigned to that particular switch.

When the current is abruptly cut off, all of the current flowing through the switch contacts at that instant is forced to flow through the natural capacitance of the windings and leads constituting the inductance in the circuit. This causes a relatively very high voltage to be produced. Thus, in tests, voltages as high as eighteen times normal have been recorded and voltages of six times normal are quite common.

As soon as the transient peak voltage caused by the charging of the natural capacitance of the circuit is reached, the process is reversed and the natural capacitance discharges through the inductance of the circuit. This interchange of energy between the inductance and natural capacitance of the circuit results in a damped oscillation at the natural frequency of the circuit. This frequency is inversely proportional to the square root of the inductance in henrys times the capacitance in farads.

In accordance with this invention, certain critical values of shunt capacitance or shunt resistance or certain critical relations between shunt resistance and shunt capacitance have been discovered which make it possible to control and predict exactly the maximum value of the recovery voltage of the circuit and, thus, to limit this voltage to maximum values which the insulation of the circuit can safely withstand. Furthermore, by means of the above mentioned critical values of resistance when applied to a non-linear resistance of the type whose resistance decreases instantaneously or exponentially with increases in voltage thereacross or current therethrough or both, the rate of rise of the circuit recovery voltage after abrupt cut-off occurs can be materially reduced. This latter feature is effective in preventing objectionable current restriking as a switch opens.

An object of this invention is to provide a new and improved electric circuit.

Another object of this invention is to provide impedance means so correlated to the constants of a circuit that when properly connected thereto they will limit the recovery voltage of the circuit to a predictable and readily controllable maximum value.

This invention will be better understood from the following description taken in connection with the accompanying drawing and its scope will be pointed out in the appended claims.

In the drawing, Figure 1 is a diagrammatic showing of an embodiment of the invention using a negative resistance-current characteristic resistance applied to the preventive reactor of a load ratio control circuit, Figure 2 is an oscillogram of an instantaneous cut-off by a switch of a sixty cycle per second alternating current before normal current zero is reached, Figure 3 is an oscillogram showing the relation between direct current interruption and switch travel, Figure 4 is an elementary diagram showing a modification of the invention using an ordinary linear shunt resistor. Figure 5 is a modification using a switch shunting resistor.

Referring now to the drawing and more particularly to Figure 1, there is shown therein a power transformer 1 connected in a power circuit 2. For changing the ratio of the transformer there are provided a plurality of taps 3, 4, 5, and 6 on one of the transformer windings. For changing these taps without interrupting the transformer current there is provided a conventional preventive reactor 7 having a core 8. An air gap 9 is provided in the core for preventing saturation. The two ends of the reactor winding are connected to switching members or contactors 10 and 11, while the electrical mid-point of the winding is connected to the remainder of the tapped winding.

Connected in shunt with the winding 7 is a protective resistor 12 which may be made of any suitable material, but which is preferably made of the ceramic material known by the trade name "Thyrite", the composition of which is disclosed and covered in Patent No. 1,822,742, granted September 8, 1931, on an application of K. B. McEachron and assigned to the assignee of the present application. This material has the property of reducing its resistance instantaneously with increases in voltage across it, or current through it, according to the formula $R \times I^a = C$ where R is the instantaneous resistance of the material, I is the current through it, a is an exponent (typically 0.7), and C is a constant depending upon the physical dimensions of the particular resistor.

With the contactors 10 and 11 in the positions shown in Figure 1, and assuming that power is flowing through the transformer, the voltage of the transformer winding between the taps 4 and 5 will cause a relatively high current to circulate in the reactor winding 7. This condition is a temporary one and represents a transition between a normal condition when both the contactors 10 and 11 are in engagement with either tap 4 or tap 5. Thus, assuming that contactor 11 has previously left tap 4 and moved to tap 5, the next step will be for contactor 10 to leave tap 4 and move to tap 5, as shown by the dotted position of contactor 10.

As soon as contactor 10 leaves tap 4 an arc will normally be drawn and as previously explained it not infrequently happens that this arc will be extinguished and the current will be cut off instantaneously at a definite value considerably before the normal zero current point is reached. The current in the circuit will then start to oscillate at the natural frequency of the circuit, which in circuits of this kind will be typically 100 times as high as a normal commercial applied frequency of 60 cycles per second. This high frequency oscillation produces abnormally high voltage and, as mentioned above, these voltages have been known to flash over the insulation of preventive reactors.

According to one aspect of this invention this oscillation will be entirely suppressed by connecting a resistance across winding 7 which has a value in ohms equal to one-half the square root of the natural inductance of the winding 7 in henrys divided by the capacitance of the winding 7 in farads, or $$0.5\sqrt{\frac{L}{C}}$$

This may be explained as follows. Let L be the inductance in henrys of the reactor 7, R the resistance in series with it, that is to say its own resistance and the resistance of its leads, etc., C the effective or natural circuit capacitance including the series and shunt capacitance of the reactor winding, leads, etc., and G the leakage conductance of the circuit containing the reactor winding 7. If now it is assumed that there is an equal but opposite current through the switch contacts at the instant of rupture, it is obvious that this superposed current will cancel the steady state current through the contacts of the switch and since there was no voltage across the switch (the contacts being closed) associated with a steady state current, the "recovery voltage" must be due entirely to the superposed current. If now we assume the current to rupture at an angle $\theta$ prior to a current zero, the superposed current is, in operational form:

$$i = I \sin(\omega t - \theta) = \frac{I p \omega \cos\theta - p^2 \sin\theta}{p^2 + \omega^2} \qquad (1)$$

The operational impedance of the circuit, as viewed from the breaker contacts, is $$Z(p) = \frac{R + pL}{LCp^2 + (LG + RC)p + (RG + 1)} \qquad (2)$$

The operational equation for the recovery voltage then is $$e = Z(p) \cdot i = \frac{I}{C} \frac{p(p+b)(\omega \cos\theta - p \sin\theta)}{(p^2 + \omega^2)(p^2 + 2ap + A^2)} \qquad (3)$$

in which $$a = \frac{1}{2}\left(\frac{G}{C} + \frac{R}{L}\right), \quad b = \frac{R}{L}, \quad A^2 = \frac{RG+1}{LC} \qquad (4)$$

Now this voltage can only be oscillatory when the roots of the expression $(p^2 + 2ap + A^2)$ in the denominator are imaginary because real roots yield exponentials with real arguments in the corresponding solution of the differential equation; whereas it is only the exponentials of imaginary arguments which connect to trigonometric (oscillatory) terms.

Therefore, considering $(p^2 + 2ap + A^2) = 0$ and solving for the roots of $p$, we have by the usual formula for the solution of a quadratic equation that $$p = -a \pm \sqrt{a^2 - A^2}$$

Now so long as $a^2$ is equal to, or greater than $A^2$, the roots will be real and the circuit will be non-oscillatory. Therefore, in order to obtain the critical value, we substitute for $a$ and $A$ the values hitherto given them in terms of the natural constants of the circuit with the result that $$\frac{1}{4}\left(\frac{G}{C} + \frac{R}{L}\right)^2 = \frac{RG+1}{LC}$$

Now in most circuits of this type R, the series resistance is so small in comparison to the natural capacitance of the circuit and to the inductance of the circuit that it can be neglected. Therefore, the above equation reduces to $$\frac{1}{4}\frac{G^2}{C^2}=\frac{1}{LC}$$

and transposing and simplifying this reduces to $$G^2=\frac{4C}{L} \text{ or } G=2\sqrt{\frac{C}{L}}$$

As G, the conductance, is a reciprocal of the shunt resistance, the shunt resistance will equal $$\frac{1}{2}\sqrt{\frac{L}{C}}$$

This, therefore, may be said to fix one limit of shunt resistance beyond which it is unnecessary to go.

The other limit of shunt resistance can be fixed according to the following criterion.

By test or calculation the maximum transient voltage, for instance the impulse voltage which the insulation of the circuit will withstand can be obtained. An impulse voltage is a voltage with a steep wave front in which the time taken for the voltage to reach its crest value from its zero value is very much less than the time required to reach one-half rest value after the crest has been passed. Thus, a typical transient for testing purposes requires one and one-half microseconds to reach its crest value from its zero value and requires about 40 micro-seconds to die down again to half the crest value. We will call the maximum impulse voltage which the circuit insulation will withstand the transient insulation level of the circuit and will assign to it the symbol V.

As previously explained every switch will have a maximum current cut-off value associated therewith. This value can be determined readily by making repeated measurements of the current cut-off as the switch is successively opened. In the load ratio control transformer contactors with which we made the test, the maximum cut-off current observed was about 5 amperes at about 10 degrees from a normal current zero. We will assign to this maximum cut-off current the symbol $i$.

Now, we have found that if the shunt resistance $r$ has a value in ohms less than V divided by $i$ that the circuit insulation will never be injured by the high voltage surge caused by abrupt current cut-off. An explanation of this is that at the instant of cut-off, all of the cut-off current must flow through the shunt resistance and therefore the voltage drop $ir$ is a measure of the maximum voltage reached at the instant of cut-off. Actually, however, all circuit inductive coils have a certain amount of natural capacitance. Consequently, all of the cut-off current does not necessarily flow through the resistor and some of it will flow through the natural shunt capacitance of the circuit, and charge this capacitance. This, therefore provides a certain margin or factor of safety. However, in ordinary circuits where no shunt capacitor is deliberately connected across the circuit elements, the natural capacitance is very small and may have little effect in limiting the voltage to a value below the transient insulation level V.

It is therefore best not to make the shunt resistance exactly equal to the ratio of $$\frac{V}{i}$$

but to provide a deliberate factor of safety, such for example as a factor of safety of 3 so that the proper value of shunt resistance $r$ should be between the ratio $$\frac{V}{i}$$

and a lower value, such for example as a value one-third of this $$\frac{(V\times i)}{3}$$

or the value of resistance which will suppress oscillation given above namely $$.5\times\sqrt{\frac{L}{C}}$$

whichever of these latter two values will be the greater.

In the modification shown in Figure 4, a linear shunt resistor is used instead of a resistor having a negative resistance-current characteristic. While this arrangement will work satisfactorily in most cases, it does not have one decided advantage produced by the use of a negative-resistance current characteristic resistance as in Figure 1. This is that by using a negative or nonlinear resistor whose resistance value decreases with increases in current, the rate of rise of the recovery voltage of the circuit after current cut-off is materially reduced. Obviously, if a simple linear resistor is used, the voltage across it is directly proportional to the current and, therefore, the recovery voltage will increase in direct proportion to the increase in current through it. However, by the use of "Thyrite" whose resistance decreases instantaneously as the voltage increases or as the current through it increases, the voltage drop across it will not increase linearly with increases in current, but, on the contrary, will not increase as fast as the current increases. Consequently, the rate-of-rise of the recovery voltage is reduced. As the switch is opening all the time that the recovery voltage is rising, this reduction in the rate-of-rise of the recovery voltage acts to minimize greatly the possibility of the arc restriking. With a very abrupt rise of recovery voltage, the recovery voltage is likely to overtake the dielectric recovery voltage of the switch and when this occurs a restrike of the arc takes place.

In Figure 5 the protective resistor is connected across the switch instead of across the inductive element of the circuit. This arrangement will also give satisfactory results, although, of course, as there is always a conductive connection between the supposedly disconnected part of the circuit and the source of supply, the portion of the circuit which is intended to be disconnected from the source is never actually disconnected therefrom and there is always danger from coming in contact with the electrified parts. Furthermore, there will be a continuous loss in the resistance at times when the switch is open. However, from the standpoint of protecting the circuit against high voltage switching surges, this location of the resistor is equally satisfactory to that shown in Figures 1 and 4.

While we have shown and described particular embodiments of this invention, it will be obvious to those skilled in the art that changes and modifications can be made therein without departing from the invention and therefore it is aimed in the appended claims to cover all such changes or modifications as fall within the true spirit and scope of the invention.

What we claim as new and desire to secure by Letters Patent of the United States, is:

1. An electric circuit containing, in combination, a source of current, an inductive element connected to carry current supplied by said source, a current interrupting element connected in circuit with said inductive element, said circuit having a transient insulation level of V volts, said current interrupting element having a maximum cut-off current of $i$ amperes, and a protective resistor connected in shunt with one of said elements, said resistor having a value $r_1$ ohms when carrying a current equal to $i$ such that the product $r_1 \times i$ is less than V.

2. An electric circuit containing, in combination, a source of current, an inductive element connected to carry current supplied by said source, a current interrupting element connected in circuit with said inductive element, said circuit having a transient insulation level of V volts, said current interrupting element having a maximum cut-off current of $i$ amperes, and a protective resistor connected in shunt with one of said elements, said resistor having a value $r_1$ ohms when carrying a current equal to $i$ such that the product $r_1 \times i$ is less than V and more than $$\frac{V}{3}$$

3. An electric circuit containing, in combination, a source of current, an inductive element connected to carry current supplied by said source, a current interrupting element connected in circuit with said inductive element, said circuit having a transient insulation level of V volts, said current interrupting element having a maximum cut-off current of $i$ amperes, and a protective resistor connected in shunt with one of said elements, said resistor having a value $r_1$ ohms when carrying a current equal to $i$ such that the product $r_1 \times i$ is less than V, said resistor also having a negative resistance-current characteristic described by the equation $R \times I^a = C$ when R is its instantaneous resistance, I is the current through it, $a$ is an exponent and C is a constant.

4. An electric circuit containing, in combination, a source of current, an inductive element connected to carry current supplied by said source, a current interrupting element connected in circuit with said inductive element, said circuit having a transient insulation level of V volts, said current interrupting element having a maximum cut-off current of $i$ amperes, and a protective resistor connected in shunt with one of said elements, said resistor having a value $r_1$ ohms when carrying a current equal to $i$ such that the product $r_1 \times i$ is less than V and more than $$\frac{V}{3}$$

said resistor also having a negative resistance-current characteristic described by the equation $R \times I^a = C$ when R is its instantaneous resistance, I is the current through it, $a$ is an exponent and C is a constant.

5. An electric circuit containing, in combination, a source of current, an inductive element connected to carry current supplied by said source, a current interrupting element connected in circuit with said inductive element, said inductive element having an inductance of L henrys and a natural capacitance of C farads, said current interrupting element having a maximum cut-off current of $i$ amperes, and a protective resistor connected in shunt with one of said elements, said resistor having a value less than $$0.5\sqrt{\frac{L}{C}}$$

6. An electric circuit containing, in combination, a source of current, an inductive element connected to carry current supplied by said source, said element having an inductance of L henrys and a natural capacitance of C farads, a current interrupting element connected in circuit with said inductive element, said circuit having a transient insulation level of V volts, said current interrupting element having a maximum cut-off current of $i$ amperes, and a protective resistor connected in shunt with one of said elements, said resistor having a value of $r_1$ ohms when carrying a current equal to $i$ such that $r_1$ is less than $$0.5\sqrt{\frac{L}{C}}$$

and less than $$\frac{V}{i}$$

7. An electric circuit containing, in combination, a source of current, an inductive element connected to carry current supplied by said source, a current interrupting element connected in circuit with said inductive element, said circuit having a transient insulation level of V volts, said current interrupting element having a maximum cut-off current of $i$ amperes, and a protective resistor connected in shunt with one of said elements, said resistor having a value of $r_1$ ohms when carrying a current equal to $i$ amperes such that the product $r_1$ times $i$ is less than V, said resistor also having a negative resistance-current characteristic.

8. An electric circuit containing, in combination, a source of current, an inductive element of L henrys connected to carry current supplied by said source, a current interrupting element connected in circuit with said inductive element, said circuit having a transient insulation of V volts, said current interrupting element having a maximum cut-off current of $i$ amperes, said element having a shunt capacitance of C farads and over-voltage protective resistance means connected in shunt with one of said elements, said shunt resistance means having a resistance of $r$ ohms satisfying the relation $r$ less than $$.5\sqrt{\frac{L}{C}}$$

9. In a load ratio control circuit, a transformer winding provided with taps, a preventive reactor adapted to be connected to bridge adjacent taps on said winding, switching means for making and breaking said bridging connection, said reactor having a transient insulation level of V volts, said switching means having a maximum cut-off current of $i$ amperes, and a protective impedance shunting said reactor and having such a value that a current through it of $i$ amperes will produce a voltage drop which is exceeded by the transient insulation level of V volts.

10. An electric circuit containing, in combination, a source of current, an inductive element connected to carry current supplied by said source, said inductive element having insulation which breaks down upon the application thereacross of a transient potential exceeding a predetermined value of V volts, a switch arranged for interrupting the current through said inductive element, said switch under normal conditions of operation having a predetermined maximum cut-off current of $i$ amperes, and a protective resistor connected in shunt with said inductive element, said resistor having such a value that the voltage drop in it caused by a current of $i$ amperes through it is less than V volts.

11. An electric circuit containing, in combination, a source of current, an inductive element connected to carry current supplied by said source, said inductive element having insulation which breaks down upon the application thereacross of a transient potential exceeding a predetermined value of V volts, a switch arranged for interrupting the current through said inductive element, said switch under normal conditions of operation having a predetermined maximum cut-off current of $i$ amperes, and a protective resistor connected in shunt with said inductive element, said resistor having such a value that the voltage drop in it caused by a current of $i$ amperes through it is less than V volts and more than $$\frac{V}{3}$$

12. An electric circuit containing, in combination, a source of current, an inductive element connected to carry current supplied by said source, said inductive element having insulation which breaks down upon the application thereacross of a transient potential exceeding a predetermined value of V volts, a switch arranged for interrupting the current through said inductive element, said switch under normal conditions of operation having a predetermined maximum cut-off current of $i$ amperes, and a protective resistor connected in shunt with said inductive element, said resistor having such a value that the voltage drop in it caused by a current of $i$ amperes through it is less than V volts, said resistor also having a negative resistance-current characteristic described by the equation $R \times I^a = C$ when R is its instantaneous resistance, I is the current through it, $a$ is an exponent and C is a constant.

13. An electric circuit containing, in combination, a source of current, an inductive element connected to carry current supplied by said source, said inductive element having insulation which breaks down upon the application thereacross of a transient potential exceeding a predetermined value of V volts, a switch arranged for interrupting the current through said inductive element, said switch under normal conditions of operation having a predetermined maximum cut-off current of $i$ amperes, and a protective resistor connected in shunt with said inductive element, said resistor having such a value that the voltage drop in it caused by a current of $i$ amperes through it is less than V volts and more than $$\frac{V}{3}$$

said resistor also having a negative resistance-current characteristic described by the equation $R \times I^a = C$ when R is its instantaneous resistance, I is the current through it, $a$ is an exponent and C is a constant.

LOUIS F. BLUME.
LOYAL V. BEWLEY.